United States Patent [19]
Haferl et al.

[11] Patent Number: 5,841,248
[45] Date of Patent: Nov. 24, 1998

[54] CHARGE CONTROLLED RASTER CORRECTION CIRCUIT

[75] Inventors: Peter Eduard Haferl; Rudolf Weber, both of Adliswil, Switzerland

[73] Assignee: RCA Thomson Licensing Corporation, Princeton, N.J.

[21] Appl. No.: 846,342

[22] Filed: Apr. 30, 1997

[51] Int. Cl.⁶ .................................................. H01J 29/56
[52] U.S. Cl. ........................................... 315/371; 315/408
[58] Field of Search ..................................... 315/371, 408

[56] References Cited

U.S. PATENT DOCUMENTS

| | | | |
|---|---|---|---|
| 4,206,388 | 6/1980 | Ishigaki et al. | 315/371 |
| 4,254,365 | 3/1981 | Knight | 315/371 |
| 4,429,257 | 1/1984 | Haferl | 315/371 |
| 4,634,937 | 1/1987 | Haferl | 315/371 |
| 4,890,043 | 12/1989 | Davie | 315/408 |
| 4,906,902 | 3/1990 | Haferl | 315/371 |
| 4,965,496 | 10/1990 | Haferl . | |
| 5,115,171 | 5/1992 | Haferl | 315/371 |
| 5,323,092 | 6/1994 | Helfrich et al. | 315/371 |
| 5,399,945 | 3/1995 | Haferl | 315/371 |

*Primary Examiner*—Theodore M. Blum
*Attorney, Agent, or Firm*—Joseph S. Tripoli; Joseph J. Laks; Sammy S. Henig

[57] ABSTRACT

An East-West switching transistor is coupled between a flyback transformer primary winding and a horizontal deflection output transistor circuit to control retrace energy to obtain an East-West modulation of the deflection current amplitude as required for East-West pincushion raster correction. A pair of series coupled first and second capacitors forming a capacitive voltage divider are coupled to a retrace resonant circuit that includes the deflection winding via a sampling switch, during a first half of a retrace interval, to produce a first ramping capacitor voltage in the first capacitor from a portion of a retrace pulse voltage. The first capacitor is coupled to an East-West pincushion raster correction current source for producing a second ramping capacitor voltage in the first capacitor that ramps in an opposite direction. A comparator is responsive to the capacitor voltage for controlling a conduction interval of the East-West switching transistor.

19 Claims, 2 Drawing Sheets

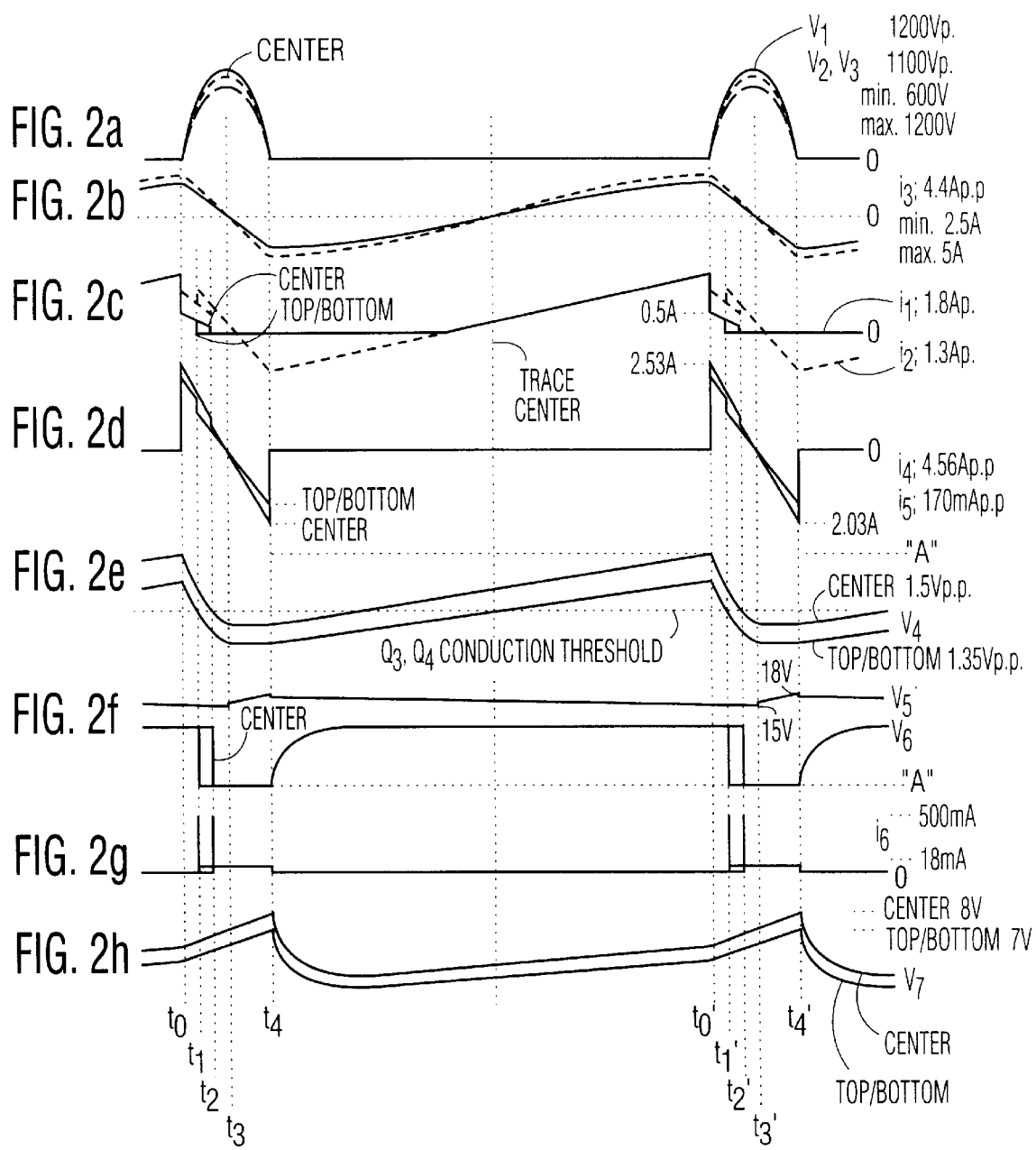

CHARGE CONTROLLED RASTER CORRECTION CIRCUIT

The invention relates to a deflection circuit of a video display apparatus. In particular, the invention relates to a control stage of an East-West (E-W) pincushion correction circuit for a cathode ray tube (CRT).

BACKGROUND

For economy reasons, in most large screen CRT displays the generation of the ultor or high voltage is accomplished in a flyback transformer which is part of a raster corrected horizontal deflection circuit. Beam current variations cause modulations of the peak current in the primary winding of the flyback transformer and of the high voltage. Primary current modulation produces undesired deflection current modulation. High voltage variations alter the deflection sensitivity and result in raster size variations.

East-west raster correction circuits require feedback to stabilize the circuit operation. Prior art feedback in east-west raster correction circuits use integration of retrace pulses to obtain a direct current (DC) error voltage for comparison with a vertical rate east-west drive voltage. The integration time constant determines the frequency response for linear operation of the east-west raster correction circuit.

The feedback requires a relatively long time constant of several horizontal line periods because of the switched operation of the horizontal deflection circuit. Therefore, fast beam current changes causing an abrupt change of high voltage may not be compensated fast enough.

Some prior art east-west raster correction circuits provide some isolation during at least the second half of the retrace time between the primary winding of the flyback transformer and the deflection circuit. An example of such an isolating raster correction circuit is the forward regulator. U.S. Pat. No. 5,399,945, entitled Raster Distortion Correction in the name of Haferl describes an example of the forward regulator.

The forward regulator includes a switching transistor connected between the primary winding and the resonant deflection circuit. The control circuit of the forward regulator requires DC feedback for operation stability. Deflection current disturbances like "mouseteeth" raster distortions caused by fast beam current changes are substantially reduced by the isolation during the second half of the retrace interval.

Any change of flyback transformer loading results in a corresponding change of the peak current in the primary winding. Raster distortions caused by peak current modulations are corrected via a feedback loop. Disadvantageously, the relatively long time constant associated with the DC feedback loop may produce an inadequate effect. In particular, fast load transitions may produce visible raster distortions.

SUMMARY

In a deflection circuit, embodying an inventive feature, a control circuit uses a technique of charge comparison across a sampling capacitor for comparing a deflection retrace current and an east-west drive current. Advantageously, the circuit is self-stabilized and needs no DC feedback. The circuit immediately compensates for load variations without the need for a DC feedback loop. Thus, the response time is much faster than if feedback loop were used and depends only upon the deflection circuit parameters such as deflection frequency, inductance of the primary winding and the yoke impedance. Furthermore, the employed sampling method improves linear operation and thermal stability.

In carrying out an inventive feature, a video display apparatus includes a deflection winding that is included in a retrace resonant circuit, during a retrace interval. A first switch is responsive to a first switch control signal at a frequency related to a first deflection frequency and coupled to the deflection winding for generating a deflection current in the deflection winding. A sampling switch is coupled to the deflection winding and to a first capacitor for sampling a signal indicative of a magnitude of the deflection current and for storing, during a first portion of a given deflection cycle, a first charge in the first capacitor that is indicative of a magnitude of the deflection current. A source of a modulation signal at a frequency related to a second deflection frequency is coupled to the first capacitor for storing, during a second portion of the given deflection cycle, in the first capacitor a second charge indicative of a magnitude of the modulation signal in an opposite direction to the first charge. A comparator is responsive to a signal developed in the first capacitor from the first and second charges for generating a second switch control signal, in accordance with a difference therebetween. A third switch is responsive to the second switch control signal and is coupled to the deflection winding for controlling the deflection current in a manner to correct a raster distortion.

BRIEF DESCRIPTION OF THE DRAWINGS

In the drawings:

FIGS. 2a–2h illustrate waveforms useful for explaining the operation of the circuit of FIG. 1.

Figure 1:
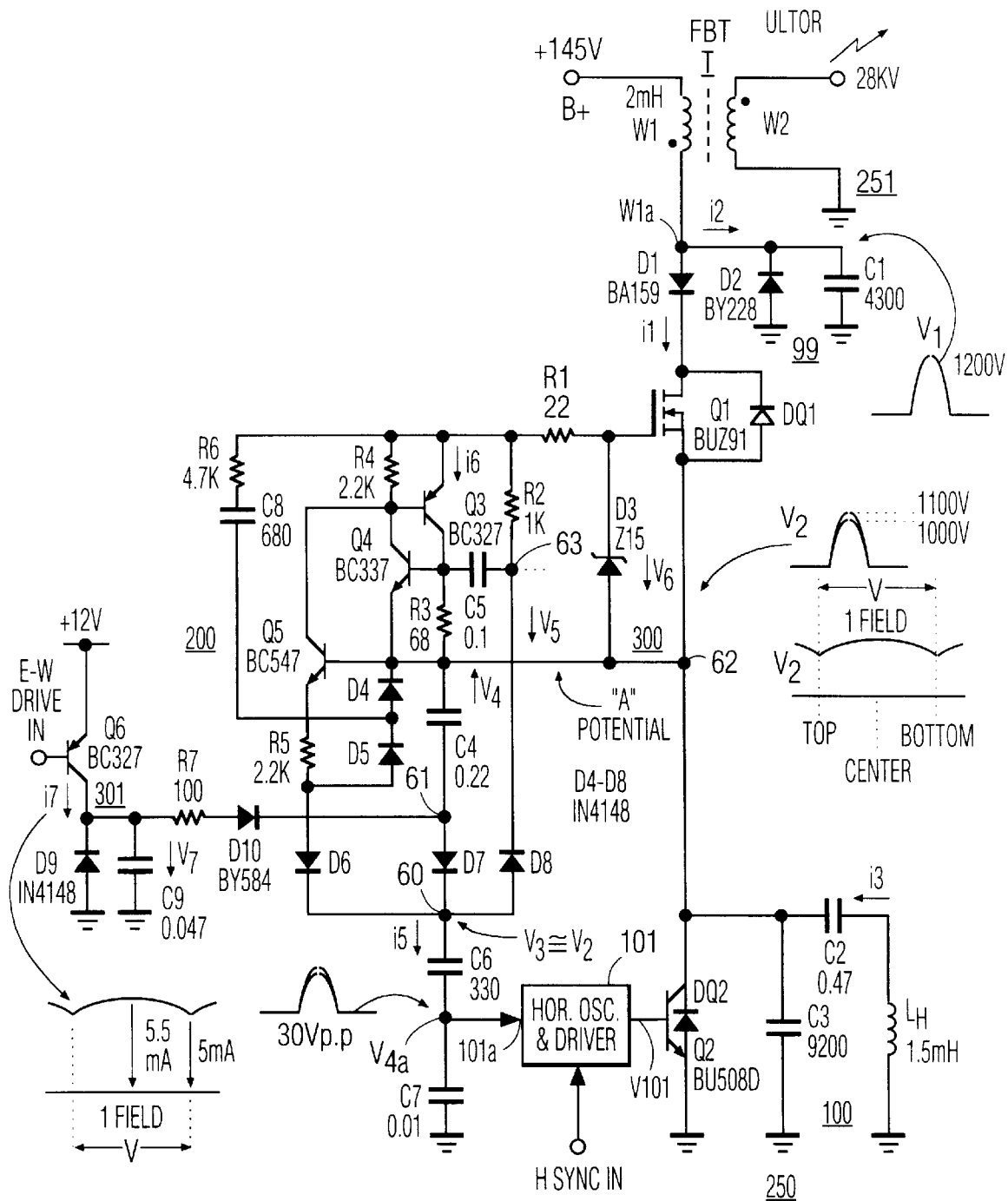
FIG. 1 shows the circuit diagram of a raster corrected horizontal deflection circuit, embodying an aspect of the invention.

A horizontal deflection circuit 250 of FIG. 1, embodying an aspect of the invention, is a forward regulator type raster corrected deflection circuit. Circuit 250 provides horizontal deflection in, for example, a color cathode ray tube (CRT) type Philips 110° A66 EAK 222X11. Circuit 250 includes a switching transistor Q2 operating at a horizontal frequency $f_H$ that is about 15,625 KHz in the PAL standard and an anti-parallel damper diode DQ2. A retrace capacitor C3 is coupled in parallel with transistor Q2 and diode DQ2. A deflection winding LH is coupled in series with an S-shaping or trace capacitor C2, forming a circuit branch that is coupled in parallel with each of transistor Q2, diode DQ2 and retrace capacitor C3, to form a retrace resonant circuit 100, during horizontal retrace.

A raster distortion correction circuit 200, embodying an inventive feature, includes an east-west (E-W) control circuit 300 that controls switching timing of a metal oxide semiconductor (MOS) switching transistor Q1 of a flyback circuit 251, during retrace. A primary winding W1 of a flyback transformer T of circuit 251 is coupled between a source of a B+ voltage and an anode of a diode D1. The cathode of diode D1 is coupled to a drain electrode of switching transistor Q1. A flyback capacitor C1 is coupled to a junction terminal W1a, between diode D1 and winding W1, to form with winding W1 a flyback resonant circuit 99 of circuit 251. The source electrode of transistor Q1 is coupled via a terminal 62 to the collector of transistor Q2 of circuit 250. A switching control voltage V101 produces a deflection current i3 and a retrace voltage V2 at terminal 62.

A control stage 101 that includes a horizontal oscillator and a phase detector, not shown in detail in FIG. 1, is responsive to a horizontal synchronizing signal H SYNC IN. Signal H SYNC IN is derived from, for example, a video detector of a television receiver, not shown, and is referenced to a common conductor or ground potential. A retrace voltage V3 produced from retrace voltage V2 is coupled via a capacitor C6 and a capacitor C7 forming a capacitive voltage divider to obtain a low amplitude retrace voltage V4a that is referenced to the common conductor or ground. Voltage V4a is applied to an input 101a of stage 101 to synchronize retrace pulse voltage V2 and deflection current i3 in winding LH to synchronizing signal H SYNC IN of the video signal. Stage 101 applies, via a conventional driver stage, not shown, switching voltage V101 to the base-emitter junction of transistor Q2 for producing a base drive current at the horizontal frequency $f_H$.

Flyback transformer T stores the required energy for the generation of a high voltage ULTOR developed from a high voltage winding W2 of transformer T. Capacitor C1 acts as flyback capacitor for the primary winding W1 of flyback transformer T. Energy recovery is provided by a damper diode D2 coupled across capacitor C1. Isolation diode D1 avoids energy return from deflection circuit 250 into flyback transformer T via a diode DQ1 coupled in parallel with transistor Q1. Because deflection circuit 250 does not supply any portion of the energy needed to generate voltage ULTOR, transformer T has a low impedance. Forward regulator transistor Q1 controls the energy applied to deflection circuit 250.

FIGS. 2a–2h illustrate waveforms useful for explaining the operation of the circuit of FIG. 1. Similar symbols and numerals in FIGS. 1 and 2a–2h indicate similar items or functions.

Transistors Q1 and Q2 of FIG. 1 are conductive during the trace interval. During trace, a voltage V5 in a capacitor C5 is coupled to the gate of a transistor Q1 via a resistor R2 to turn on transistor Q1. At the beginning of the retrace interval, instant t0 of FIG. 2a, transistor Q2 of FIG. 1 becomes cut-off. Consequently, a flyback voltage V1 across flyback capacitor C1 and retrace voltage V2 across retrace capacitor C3 start to increase, as shown in FIG. 2a. Transistor Q1 of FIG. 1 is turned off at a controllable instant between times t1 and t2 of FIG. 2f, illustrating the waveform of a switching gate-source voltage V6 of transistor Q1 of FIG. 1.

At the top of the raster, transistor Q1 turns off at time t1 of FIG. 2c. Toward the center, the turn-off instant shifts toward time t2, resulting in a higher deflection current as shown by the envelope waveform at vertical rate of voltage V2 in FIG. 1.

The current in primary winding W1 of FIG. 1 increases toward the end of trace as shown by current i1 in FIG. 2c. During retrace, primary winding W1 current divides into currents i1 and i2. Current i1 flows through transistor Q1 of FIG. 1 into deflection circuit 250. Whereas, current i2, shown in dotted lines in FIG. 2c, flows through capacitor C1. The current divides according to the respective impedances in the current paths of currents i1 and i2 and also according the voltage difference between voltages V1 and V2. Current i1 provides, in accordance with the modulated instants t1–t2, the necessary charge to energize deflection circuit 250 for obtaining deflection current i3 modulated at a vertical rate, as illustrated by FIG. 2b.

Deflection current i3 of FIG. 1 divides, during the retrace interval, into a main retrace current i4, flowing through capacitor C3, and into a retrace sampling current i5. Current i5 at a positive polarity flows through a series coupled arrangement of a capacitor C4, a diode D7 and capacitors C6 and C7. Capacitor C6 having the smallest value in the series coupled capacitors determines the amplitude of current i5. FIG. 2d shows currents i4 and i5 having similar shapes but different amplitudes, as indicated. The abrupt changes in the waveforms at times t1 and t2 in FIG. 2d illustrate also the change in transistor Q1 current i1 of FIG. 2c.

Current i1 of FIG. 1 replenishes the charge in retrace capacitor C3 and in series coupled capacitors C4, C6 and C7, within the first half of the retrace interval, to obtain the desired deflection current amplitude, during the following trace interval. Current i1 determines the peak value of retrace voltage V2 and of deflection current i3.

At time t0 of FIG. 2a, the beginning of retrace, a switch diode D10, that couples an E-W current generating circuit 301 to circuit 300 of FIG. 1, is cut off by increasing retrace voltage V2. During the first half of the retrace interval, interval t0–t3 of FIG. 2d, positive current i5 charges, via diode D7, capacitor C4 of FIG. 1 to develop a ramp voltage V4 in capacitor C4 for sampling deflection current i3. Current i5 charges capacitor C6 to develop voltage V3, at an upper terminal 60 of capacitor C6. Capacitor C4, C5, C6 and C7 form a capacitive voltage divider to obtain the 30V pulse voltage V4a.

During the second half of retrace, negative current i5 discharges capacitor C6 via a diode D8, capacitor C5 and a base-emitter junction of transistor Q4. Advantageously, negative current i5 charges capacitor C5 via a reactive current path to develop voltage V5 such that power is not dissipated in the process of developing voltage V5. Voltage V5 of FIG. 2f supplies via resistor R2 of FIG. 1, that is coupled to the gate of transistor Q1 a gate supply voltage for producing a gate voltage V6, as explained before. Voltage V6 controls the switching operation of transistor Q1. The value of capacitor C6 determines the amplitude of current i5. The value of capacitor C6 is selected to obtain sufficiently large level of voltage V5 to maintain transistor Q1 in saturation at the narrowest picture width. Voltage V3 equals approximately voltage V2 because voltage V4 is much smaller than voltage V2.

Voltage V4 across capacitor C4 is shown by waveform of FIG. 2e. For explanation purposes, voltage V4 of FIG. 1 is referenced to voltage V2, indicated by the letter "A" and associated with the potential at terminal 62. A voltage developed at a lower terminal 61 of capacitor C4 changes negatively with respect to the "A" potential at terminal 62 until time t3 of FIG. 2e, thus producing a downramping retrace voltage shape portion. At time t3 of FIG. 2a, voltage V2 starts to decrease, thereby turning off diode D7 of FIG. 1 and turning on diode D8. Diode D8 has an anode that is coupled to terminal 60. As a result, voltage V4 of FIG. 2e remains constant during the interval t3–t4. Whereas, at time t4, voltage V2 of FIG. 2a is near zero volts.

Because of the decrease in voltage V2, voltage V4 across capacitor C4 of FIG. 1 forward biases diode D10. A current source transistor Q6 of circuit 301 produces a current i7. Current i7 discharges capacitor C4, during the trace interval t4–t0', illustrated as upramping portion of voltage V4 of FIG. 2e. Assume that the positive and negative portions of current i5 are approximately equal. Therefore, current i5 is equal to the discharge current of capacitor C5 which provides the supply current of control circuit 300.

Thus, voltage V4 is developed as a result of the charge current via diode D7 and the discharge current via diode D10. The average value of voltage V4 is constant when the charge and discharge are equal. A comparator transistor Q5 of FIG. 1 has a base electrode coupled to terminal 62. An emitter electrode of transistor Q5 is coupled via an emitter resistor R5 and a switch diode D6 to terminal 60.

During a portion of the charge interval to −t3 of FIG. 2e, downramping voltage V4 is applied via conductive diode D7 to transistor Q5 to turn on transistor Q5 of FIG. 1. The current in the current path that includes resistor R5, conductive diode D6 and transistor Q5 produces an upramping collector current in transistor Q5. The collector current in transistor Q5 is coupled to a collector resistor R4 of transistor Q5. When the collector current of transistor Q5 reaches about 0.2 mA, it triggers a regenerative switch formed by the pair of transistors Q3 and Q4 forming a latch. The positive feedback causes transistors Q3 and Q4 to saturate rapidly and to turn off transistor Q1.

Current i6 of FIG. 2g shows the narrow gate turn-off current peaks of 500 mA. Transistor Q1 remains cut off until the end of retrace. The trigger level of transistors Q3 and Q4 is shown in the waveform of voltage V4 of FIG. 2e by the horizontal dotted line referred to by the phrase "Q3, Q4 conduction threshold". The crossover point with the waveform of voltage V4, determines the turn off instant time t1 or t2 of transistor Q1 of FIG. 1, during retrace.

Transistors Q3 and Q4 are held in saturation until at least time t3 by the discharge current in a capacitor C8. The discharge current of capacitor C8 flows in a current path that includes a diode D5, resistor R5, transistor Q5, the base-emitter of transistor Q3 and a resistor R6. During trace, capacitor C8 has been charged to develop a voltage that is approximately equal to voltage V6 or approximately 15V, as explained later on.

The saturation of transistors Q3 and Q4 is maintained until the end of retrace by negative current i5 which flows through diode D8 and charges capacitor C5. At the end of retrace, time t4, transistors Q3 and Q4 are self turned off. This is so because the collector current of transistor Q3 is always smaller than the current in resistor R2 if the currents in a gate resistor R1 of transistor Q1, in resistor R6 and in transistor Q5 are all zero. Thus, a gate turn-off regenerative switch, formed by transistors Q3 and Q4, is triggered at the crossover points of FIG. 2e. The current peaks of 500 mA of current i6 of FIG. 2g illustrate the discharge of a gate capacitance, not shown, associated with transistor Q1 of FIG. 1. The low current pulse of 18 mA of current i6 of FIG. 2g illustrates the current flowing through resistor R2 and transistor Q3.

As indicated before, the triggering current that turns on transistor Q5 for triggering the regenerative switch flows in the current path that includes the emitter of transistor Q5, resistor R5 and diode D6. The triggering current shunts a small amount of current i5 away from capacitor C4. The portion of current i5 that is shunted from capacitor C4 because of the triggering of transistor Q5 could introduce a small error to the charge balance of capacitor C4.

To reduce the amount of shunt current, the discharge current of capacitor C8, between the trigger instant and time t3, is used for back biasing diode D6 in a manner to cause the shunt current to cease. Thereby, advantageously, the error is reduced. Capacitor C8 charges, during the trace interval, to 15 Volts, as indicated before.

Capacitor C6 discharges, during the second half of the retrace interval, via diode D8 and charges capacitor C5 to voltage V5 between 12 Volts and 24 Volts, depending upon the raster width. Voltage V3 at upper terminal 60 of capacitor C6 remains at approximately the level of voltage V5, during the trace interval, after diode D8 becomes non-conductive. Thereby, trace voltage V3 maintains diodes D6 and D7 non conductive. This avoids erroneous triggering of transistor Q1, during trace.

Gate resistor R1 acts as current limiter. A zener diode D3 coupled between the source and gate electrodes of transistor Q1 acts as a voltage limiter. FIG. 2f shows the gate-source voltage V6 of transistror Q1. The slow increase of voltage V6 just after time t4 is caused by the gate capacitance which is being charged via resistor R2 of FIG. 1.

The amplitude of deflection current i3 is determined by the turn off instant of transistor Q1 that is controlled by the crossover point of voltage V4 with the conduction threshold of transistor Q5, as illustrated in FIG. 2e. A turn-off instant closer to time t0 results in lowest amplitudes of voltage V2 and current i3. Conversely, a turn-off instant at time t3 results in highest amplitudes, as indicated in FIGS. 2a and 2b.

For example, an increase of vertical rate parabolic current i7 via diode D10 of FIG. 1 level-shifts the peak level of voltage V4 of FIG. 2e and also the average value of voltage V4 in the positive direction, causing a later turn-off instant of transistor Q1 of FIG. 1. As result, current i1 flows during a longer interval into deflection circuit 250.

Thereby, current i1 produces a higher amplitude of current i3 and, in turn, a higher amplitude of current i5. The higher amplitude of current i5 maintains the amount of charge and discharge in capacitor C4 in equilibrium. The higher amplitude of current i5 stabilizes the average value of voltage V4 at a level proportional to the increased level of current i7. As shown by FIG. 2e, the peak to peak voltage V4 is higher at the center of the raster, corresponding to a higher amplitude of current i3, than at the top and bottom of the raster.

In carrying out an inventive feature, the average value of voltage V4 is also self-adjusted or automatically calibrated to changes in the conduction threshold level of comparator transistor Q5. Calibration occurs because the discharge of capacitor C4 by current i7 is automatically maintained exactly equal to the charge provided by current i5. Any difference between charge and discharge of capacitor C4 tends to be compensated by a corresponding change in the trigger point of transistor Q5 in a manner to provide for an automatic change in the average value of voltage V4. The result is that, advantageously, no DC feedback path is required.

Transistor Q6 acts as a current source to make the discharge operation of capacitor C4 independent of variations of the forward voltage of diode D10 and of the saturation voltage of transistor Q2. Current i7 charges a capacitor C9, during retrace, when diode D10 is non conductive. Capacitor C9 discharges at the beginning of trace. The waveform of FIG. 2h shows voltage V7 across capacitor C9 of FIG. 1. In this way current i7 discharges capacitor C4 by an amount that is independent of the length of the non-conductive interval of diode D10. Such length may be altered by the turn-off characteristic of transistor Q2. A resistor R7 coupled in series with diode D10 limits parasitic currents caused by negative transient voltage peaks across deflection damper diode DQ2. A protection diode D9 coupled across capacitor C9 provides an additional current path for discharging capacitor C4 to prevent capacitor C4 from being excessively charged when current i7 is too low.

For start-up operation, assume that supply voltage B+ of 145V is turned on and that the horizontal oscillator and driver are in operation. Current i7 charges capacitor C5 via diodes D10, D7 and D8, resistor R3 and transistor Q2. Current i7 charges also capacitor C4. The resistance of resistor R3 is selected such that the current portion of current i7 which charges capacitor C5 does not produce significant voltage drop across resistor R3 sufficient to turn on transistor Q4. The increasing voltages V5 and V6 cause each of the forward conduction of transistor Q1, current i1 and retrace pulse voltages V1 and V2 to increase. The charges of the start-up retrace pulses produce a further increase of voltage V5, shifting the operation of transistor Q1 from class A operation to switched class D operation. The turn-off instant of transistor Q1 shifts from time t3, at the beginning of class D operation, to the modulated interval t1–t2, when normal operation is established.

Advantageouslly, the charge balance across capacitor C4 improves circuit linearity such that deflection current i3 is linearly proportional to current i7. Because the charge is maintained balanced in capacitor C4, advantageously, DC feedback is not required. Advantageously, because the circuit does not utilize a DC feedback circuit, parasitic oscillations and overshoots during drive signal transitions are small.

The charge balance across capacitor C4 also provides thermal stability. Any change of the forward voltages of diodes D6, D7 and of the base-emitter junctions of transistors Q5 and Q3 are compensated by a corresponding change of the average value of voltage V4. The average value of voltage V4 is affected by all associated forward voltages such that the charge of capacitor C4 equals the discharge. Any difference between charge and discharge results in a change of average voltage V4.

Assume that an unmodulated current i7 produces an unmodulated deflection current i3. A change of the forward voltages because of temperature change, for example, produces a change of average voltage V4 such that the aforementioned intersection point of voltage V4, the turn-off instant of transistor Q1 and the deflection current i3 remain unchanged.

Load variations in any of the secondary windings of flyback transformer T, such as in winding W2 of FIG. 1, produce a corresponding change of the peak current in primary winding W1 at time t0 of FIG. 2c. As a result, the amplitude of current i1 changes accordingly and, in turn, deflection current i3. This effect is characteristic to combined deflection and flyback transformer circuits. However, the sampling method used in control circuit 200, advantageously, suppresses raster distortions associated with such load variations. Current i5 of FIG. 2d is a sample of the sum of currents i1 and i4. For example, an increase of current i1 produces an increase of current i5. As a result, voltage V4 of FIG. 2d is ramping down faster after time t0, advancing the intersection point toward time t0. Conversely, a decrease of the peak amplitude of current i1 delays the intersection point and, in turn, the turn-off instant of transistor Q1. Thus any changes of the peak amplitude of current i1 are immediately compensated by a corresponding shift of the modulation interval t1–t2. Thereby, advantageously, suppression of raster distortions caused by variations of the peak current amplitude in the primary winding W1 of flyback transformer T is obtained.

We claim:

1. A video display apparatus, comprising:
   a deflection winding included in a retrace resonant circuit, during a retrace interval;
   a first switch responsive to a first switch control signal at a frequency related to a first deflection frequency and coupled to said deflection winding for generating a deflection current in said deflection winding;
   a first capacitor;
   a sampling switch coupled to said deflection winding and to said first capacitor for sampling a signal indicative of a magnitude of said deflection current and for applying the sampled signal, during a first portion of a given deflection cycle, to said first capacitor to store in said first capacitor a first charge that is indicative of a magnitude of said deflection circuit;
   a source of a modulation signal at a frequency related to a second deflection frequency coupled to said first capacitor for storing, during a second portion of said given deflection cycle, in said first capacitor a second charge indicative of a magnitude of said modulation signal, in an opposite direction to said first charge;
   a comparator responsive to a signal developed in said first capacitor from said first and second charges for generating a second switch control signal, in accordance with a difference therebetween; and
   a third switch responsive to said second switch control signal and coupled to said deflection winding for controlling said deflection current in a manner to correct a raster distortion.

2. An apparatus according to claim 1 wherein, when said first charge is being stored, a voltage developed in said first capacitor is ramping and wherein said comparator is responsive to said ramping voltage for generating said second switch control signal when a threshold level of said comparator is crossed over.

3. An apparatus according to claim 1 wherein said sampling switch samples a portion of a retrace pulse voltage developed in said deflection winding, during a corresponding portion of said retrace interval.

4. An apparatus according to claim 3 wherein said sampling switch samples a peak voltage of said retrace pulse voltage and decouples said first capacitor from said retrace resonant circuit, following the occurrence of said peak voltage.

5. An apparatus according to claim 1 wherein said first capacitor is coupled to said deflection winding and is included in said retrace resonant circuit to form a retrace capacitance, during a portion of said retrace interval.

6. An apparatus according to claim 5 wherein said retrace resonant circuit includes a second retrace capacitance.

7. An apparatus according to claim 1 further comprising, a second capacitor coupled to said first capacitor to form a capacitive voltage divider for charging said second capacitor in one direction and a fourth switch coupled to said second capacitor for charging said second capacitor in the opposite direction.

8. An apparatus according to claim 1 further comprising, a flyback capacitance coupled to a supply inductance to form a flyback resonant circuit that is coupled via said third switch to said deflection winding, during a portion of said retrace interval to form a forward regulator.

9. An apparatus according to claim 8 wherein said supply inductance comprises a primary winding of a flyback transformer, wherein said transformer is coupled to an ultor terminal forming a load with respect to said transformer that varies in accordance with a beam current variation and wherein said third switch decouples said retrace resonant circuit from said load.

10. An apparatus according to claim 1 wherein said third switch operates in a conductive state during a first portion of said retrace interval and in a non-conductive state, during a second portion of said retrace interval.

11. An apparatus according to claim 1 wherein said third switch is included in an east-west modulator.

12. An apparatus according to claim 1 wherein said deflection current is controlled in a manner to maintain said first charge equal to said second charge for a given magnitude of said modulation signal.

13. An apparatus according to claim 1 wherein a change is said deflection current magnitude indicative signal produces a corresponding change in said first charge on a cycle-by-cycle basis.

14. An apparatus according to claim 1 wherein said first charge is developed during a substantially shorter interval than said second charge.

15. A video display apparatus, comprising:

a deflection winding included in a retrace resonant circuit;

a first switch responsive to a first switch control signal at a frequency related to a deflection frequency and coupled to said deflection winding for generating a deflection current and a retrace pulse voltage that is indicative of a magnitude of said deflection current in said deflection winding;

a first capacitor coupled to a second capacitor to form a capacitive voltage divider;

a second switch for applying said retrace pulse voltage to said capacitive voltage divider to develop in said first capacitor a portion of said retrace pulse voltage, during a portion of a deflection cycle;

a source of an East-West modulation signal coupled to said first capacitor for varying the voltage developed in said first capacitor in accordance with said modulation signal;

a comparator responsive to the voltage developed in said first capacitor;

a third switch responsive to an output signal of said comparator and coupled to said deflection winding for controlling said deflection current in a manner to correct a raster distortion.

16. An apparatus according to claim 15 wherein said comparator generates said output signal, when a threshold of said comparator is crossed over.

17. An apparatus according to claim 15 further comprising, a fourth switch coupled to said second capacitor for initializing a charge stored in said second capacitor, prior to said deflection cycle portion.

18. An apparatus according to claim 17 wherein each of said second and fourth switches comprises a corresponding diode that are coupled to a terminal of said second capacitor.

19. An apparatus according to claim 15 further comprising, a source of an input supply voltage, a supply inductance coupled to said source of input supply voltage for developing a flyback pulse voltage in said supply inductance, wherein said third switch is coupled to said supply inductance and to said retrace resonant circuit for coupling said supply inductance to said retrace resonant circuit to replenish energy losses in said retrace resonant circuit, said third switch decoupling said supply inductance from said retrace resonant circuit, during a controllable portion of said retrace pulse voltage.

* * * * *